(12) United States Patent
Abadi et al.

(10) Patent No.: US 12,355,476 B2
(45) Date of Patent: Jul. 8, 2025

(54) SIGNAL DETECTION FOR POWER SAVING IN SIMULTANEOUS BIDIRECTIONAL SIGNALING

(71) Applicant: NVIDIA Corporation, Santa Clara, CA (US)

(72) Inventors: Ofek Abadi, Nahariya (IL); Omer Wolkovitz, Kfar Saba (IL)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 18/499,590

(22) Filed: Nov. 1, 2023

(65) Prior Publication Data
US 2025/0141484 A1   May 1, 2025

(51) Int. Cl.
H04B 1/16   (2006.01)
H04B 1/40   (2015.01)

(52) U.S. Cl.
CPC ............. H04B 1/1607 (2013.01); H04B 1/40 (2013.01)

(58) Field of Classification Search
CPC ................................ H04B 1/1607; H04B 1/40
See application file for complete search history.

(56) References Cited

U.S. PATENT DOCUMENTS

2004/0184601 A1* 9/2004 Kim .................... H04L 25/0272
380/1
2020/0313840 A1* 10/2020 Den Besten .......... H04J 3/1694
2021/0243001 A1* 8/2021 Dalmia ............. H04L 12/40039

OTHER PUBLICATIONS

Y. Nishi et al., "A 0.297-pJ/bit 50.4-GB/s/wire Inverter-Based Short-Reach Simultaneous Bidirectional Transceiver for Die-to-Die Interface in 5nm CMOS," 2022 IEEE Symposium on VLSI Technology and Circuits (VLSI Technology and Circuits), Honolulu, HI, USA, 2022, pp. 154-155, doi: 10.1109/VLSITechnologyandCir46769.2022.9830174.

\* cited by examiner

*Primary Examiner* — Sung S Ahn
(74) *Attorney, Agent, or Firm* — Lowenstein Sandler LLP (57) ABSTRACT

An integrated circuit includes a first transceiver of multiple simultaneous bidirectional (SBD) transceivers that is coupled to a second transceiver across a channel. A signal detection circuit is coupled to a first receiver, a first transmitter, and to an I/O pad of the first transceiver. The signal detection circuit deactivates the first receiver. The signal detection circuit activates an activation circuit in response to deactivating the first receiver. The signal detection circuit detects, using the activation circuit, whether the second transmitter enters a transmission mode based on a transmission status of the first transmitter and on voltage transitions detected over the I/O pad from the second transmitter.

21 Claims, 9 Drawing Sheets

Deactivate, by the signal detection circuit, the first receiver in response to detecting that a second transmitter of the second transceiver is in an idle mode.
810

Enable an activation circuit of the signal detection circuit.
820

Detect, using the activation circuit, whether the second transmitter enters a transmission mode based on a transmission status of the first transmitter and on voltage transitions detected over the input pad, of the first transceiver, from the second transmitter.
830

FIG. 8

SIGNAL DETECTION FOR POWER SAVING IN SIMULTANEOUS BIDIRECTIONAL SIGNALING

TECHNICAL FIELD

At least one embodiment generally pertains to communications systems, and more specifically, but not exclusively, to signal detection for power saving in simultaneous bidirectional signaling.

BACKGROUND

In parallel interfaces of some communications systems, such as die-to-die and chip-to-chip, there exists a need to increase the data bandwidth-to-area efficiency, e.g., total transmitted bandwidth per total transceiver area, and bandwidth-to-pins efficiency, e.g., total transmitted bandwidth per total number of pins used for communication. In simultaneous bidirectional (SBD) signaling, there are two transceivers, one on each side of each communication channel. A transceiver includes a transmitter and a receiver. Therefore, the total transmitted bandwidth is doubled (due to transmitting and receiving simultaneously) compared to unidirectional signaling and both the bandwidth-to-area efficiency and the bandwidth-to-pins efficiency can be increased.

Since the bandwidth-to-pins efficiency and bandwidth-to-area efficiency are important metrics sought to be minimized, most parallel communications systems (including some SBD communications systems) are often implemented using single-ended signaling. In single-ended signaling, a signal is transmitted over one wire, with another wire used as a ground or reference voltage. Furthermore, in parallel interfaces in general and in SBD interfaces in particular, there are many transceivers on each side. Since each transceiver is duplicated many times in this parallel communications system, reducing power consumption in each transceiver translates to a significant power consumption savings in the overall communications system.

BRIEF DESCRIPTION OF DRAWINGS

Various embodiments in accordance with the present disclosure will be described with reference to the drawings, in which.

DETAILED DESCRIPTION

In some implementations of parallel interfaces in communications systems (e.g., across dice or integrated circuit chips), signal detection may be performed as to a mode of the opposite transmitter to save power in the near-side receiver. Further to what was previously discussed, during a transmission mode operation, the transceivers on each side of a communication channel concurrently transmit and receive live data. When the SBD transceiver at a first side exits transmission mode to idle mode, however, the transmitter of this SBD transceiver continues to transmit bits to the transceiver at the second side of the channel (e.g., to the second transceiver of an SBD transceiver pair). These bits are typically all the same value (e.g., all ones or all zeroes), which is not considered "live" or meaningful data.

Because the receiver of this second transceiver on the second side of the channel continues to receive bits of the same value even during idle mode, the second transceiver consumes more power than necessary because its receiver need not be turned on while the transmitter at the first side is idle mode. Receivers that remain active during idle mode of the opposing transmitter consumes significant power unnecessarily. A problem with simply turning off the receiver, however, is that the inactive receiver does not detect the information sent by the opposing transmitter and thus cannot determine when the opposing transmitter exits idle mode and starts transmitting live (or meaningful data).

Aspects and embodiments of the present disclosure address the above deficiencies by employing a signal detection circuit within the SBD transceiver pairs that is configured to, with a lower power imprint than keeping the receiver activated, monitor incoming bits from the opposing transmitter to determine when the opposing transmitter enters and exits idle mode. More specifically, in at least some embodiments, this signal detection circuit monitors the incoming bits from the opposing transmitter, and deactivates (or powers off) the receiver on the near side of the channel in response to detecting that the opposing transmitter has entered idle mode (e.g., begins transmitting consecutive bits of the same value). In this way, the transceiver that includes such signal detection circuit saves power, which will be described in more detail. Detecting the number of bit transitions may include using a threshold number of transitions (or consecutive bits) that define a minimum transition density, as may be required may particular line encodings.

In some embodiments, the signal detection circuit further activates (e.g., powers on) an activation circuit of the signal detection circuit in response to deactivating the receiver or detecting the second transmitter is in the idle mode. In this way, the activation circuit can be employed with a minimal amount of power to continue monitoring bits received from the opposing transceiver. In some embodiments, the activation circuit detects whether the opposing transmitter enters a transmission mode based on a transmission status of the near-side transmitter (e.g., whether in idle or transmission mode) and based on voltage transitions of bits detected over an input/output (I/O) pad from the opposing transmitter. In at least some embodiments, the signal detection circuit activates the receiver on the near side of the channel in response to detecting that the incoming bits no longer transmit the same value, e.g., begin to transition between values. Once the receiver is activated (e.g., powered back on), the signal detection circuit may deactivate the activation circuit, and thus continue to save power from not using the activation circuit when the activation circuit is not needed.

Therefore, advantages of the transceivers, systems, and methods implemented in accordance with some embodiments of the present disclosure include, but are not limited to, the ability to significantly reduce wasted power by deactivating a receiver when an opposing transmitter of an SBD transceiver pair is in idle mode, and activating the receiver upon detecting the opposing transmitter enter transmission mode. These advantages are achievable with minimal additional circuitry in each transceiver, which when employed instead of the receiver to monitor for and detect data bit transitions from the opposing receiver, minimizes consumption of overall power in an SBD-based communications system. Other advantages will be apparent to those skilled in the art of SBD-based transceiver interface design, as will be discussed hereinafter.

Figure 1:
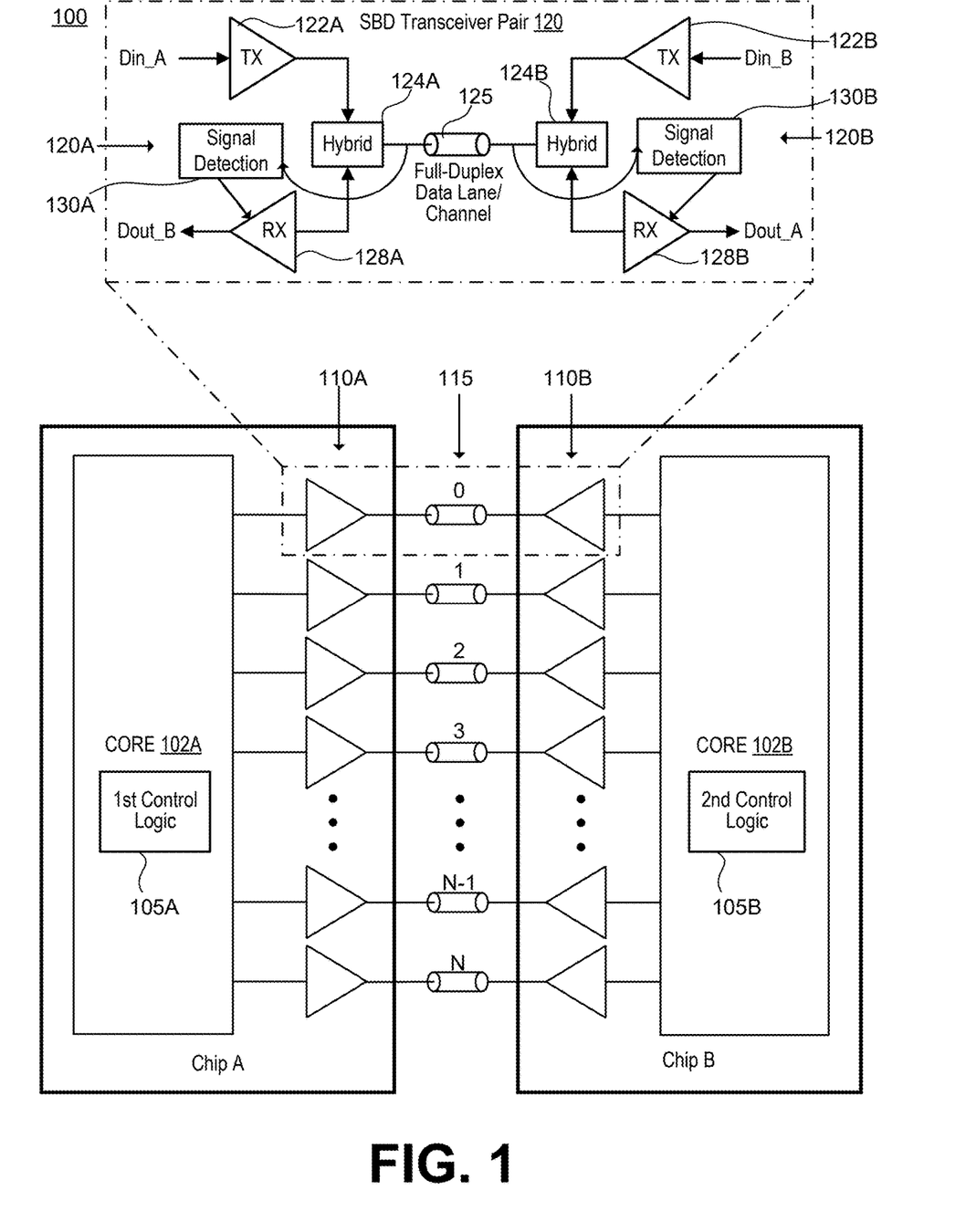
FIG. 1 is a schematic block diagram of an example SBD communications system implementing signal detection to save power according to various embodiments.

FIG. 1 is a schematic block diagram of an example SBD communications system 100 implementing signal detection to save power according to various embodiments. In various embodiments, the system 100 includes a first integrated circuit (IC) chip or die (e.g., Chip A) and a second IC chip or die (e.g., Chip B). In these embodiments, Chip A includes a first processing core 102A having first control logic 105A, and Chip B includes a second processing core 102B having second control logic 105B. Further, in at least some embodiments, Chip A includes a first plurality of transceivers 110A coupled to the first processing core 102A (and thus to the first control logic 105A), and Chip B includes a second plurality of transceivers 110B coupled to the second processing core 102B (and thus to the second control logic 105B). In some embodiments, although not illustrated, the first control logic 105A is instead located between the first processing core 102A and the first plurality of transceivers 110A, and the second control logic 105B is instead located between the second processing core 102B and the second plurality of transceivers 110B. In some embodiments, one or more of the first processing core 102A, the second processing core 102B, the first IC chip or die (Chip A), and the second IC chip or die (Chip B) are central processing units (CPUs), graphics processing units (GPUs), or data processing units (DPUs).

In various embodiments, the system 100 further includes a plurality of channels 115 communicatively coupled between the plurality of first transceivers 110A and the second plurality of transceivers 110B, e.g., and thus between Chip A and Chip B. In some embodiments, a communication interface (or data interface) is formed between Chip A and Chip B by the first and second plurality of transceivers 110A and 110B and the plurality of corresponding channels 115. In some embodiments, the plurality of channels 115 are also referred to as data lanes or an external bus. In some embodiments, the second plurality of transceivers 110B are coupled in parallel to the first plurality of transceivers 110A over corresponding channels of the plurality of channels 115. Due to this coupling over a single channel, intercoupled transceivers of the first and second plurality of transceivers 110A and 110B are simultaneous bidirectional (SBD) transceivers, which was discussed previously.

In some embodiments, the first control logic 105A is configured to determine and/or generate data to be passed over various ones of the first plurality of transceivers 110A. Similarly, in these embodiments, the second control logic 105B is configured to determine and/or generate data to be passed over various ones of the second plurality of transceivers 110B. In at least some embodiments, the first and second processing cores 102A and 102B control transitions between idle mode and transmission mode in terms of what data is being transmitted over which transceivers. In certain communication devices and systems, idle mode involves transmitting all the same values such as only ones or only zeros (sometimes referred to as dummy data) over the plurality of channels 115 or at least a subset of the plurality of channels 115. In transitioning to transmission mode, the first processing core 102A and the second processing core 102B begin to send meaningful data back and forth over the plurality of channels 115 via the first and second plurality of transceivers 110A and 110B, respectively.

In some embodiments, because the first and second plurality of transceivers 110A and 110B form SBD transceiver pairs 120, each SBD transceiver pair 120 communicates over a single channel 125 that constitutes, for example, a full-duplex data lane over which data can be concurrently sent and received by either transceiver. For example, each SBD transceiver pair 120 may include a first transceiver 120A coupled to a second transceiver 120B over the channel 125.

In some embodiments, the first transceiver 120A includes a first transmitter 122A that transmits first data (e.g., Din_A received from the first processing core 102A), a first receiver 128A that receives second data (e.g., Dout_B) over the channel 125 from the second transceiver 120B, and hybrid circuitry 124A coupled between the first transmitter 122A, the channel 125, and the first receiver 128A. In some embodiments, the hybrid circuitry 124A facilitates the full-duplex nature of data communication between the first and second transceivers 120A and 120B. For example, the hybrid circuitry 124A may cancel out interference of the first data being transmitted by the first transmitter 122A when receiving the second data over the channel 125.

Figure 3A:
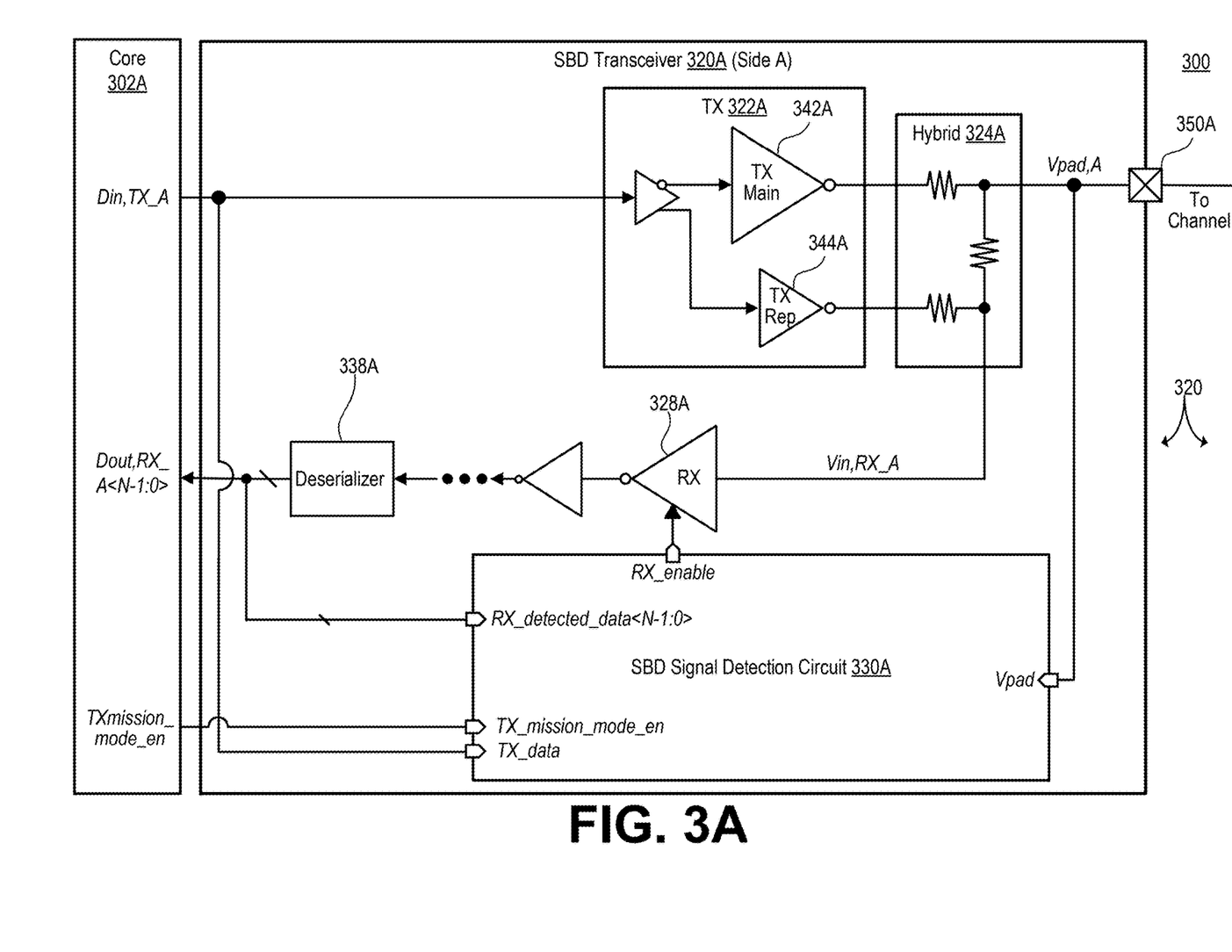
FIGS. 3A-3B are a schematic block diagram of an example SBD communications system focused on a particular SBD transceiver pair implementing signal detection for power savings according to at least some embodiments.

In some embodiments, the first transceiver 120A includes a first signal detection circuit 130A coupled between an I/O pad from the channel 125 and the first receiver 128A (better illustrated in FIG. 3A). In some embodiments, the first signal detection circuit 130A activates or deactivates the first receiver 128A depending on a mode signal received from the first transmitter 122A and the transition of data bits received by the I/O pad over the channel 125 from the second transmitter 122B.

In at least some embodiments, the second transceiver 120B includes a second transmitter 122B that transmits second data (e.g., Din_B received from the second processing core 102B), a second receiver 128B that receives second data (e.g., Dout_A received over the channel 125 from the first transceiver 120A, and hybrid circuitry 124B coupled between the second transmitter 122B, the channel 125, and the second receiver 128B. In some embodiments, the hybrid circuitry 124B facilitates the full-duplex nature of data communication between the first and second transceivers 120A and 120B. For example, the hybrid circuitry 124B may cancel out interference of the second data being transmitted by the second transmitter 122B when receiving the first data over the channel 125.

Figure 3B:
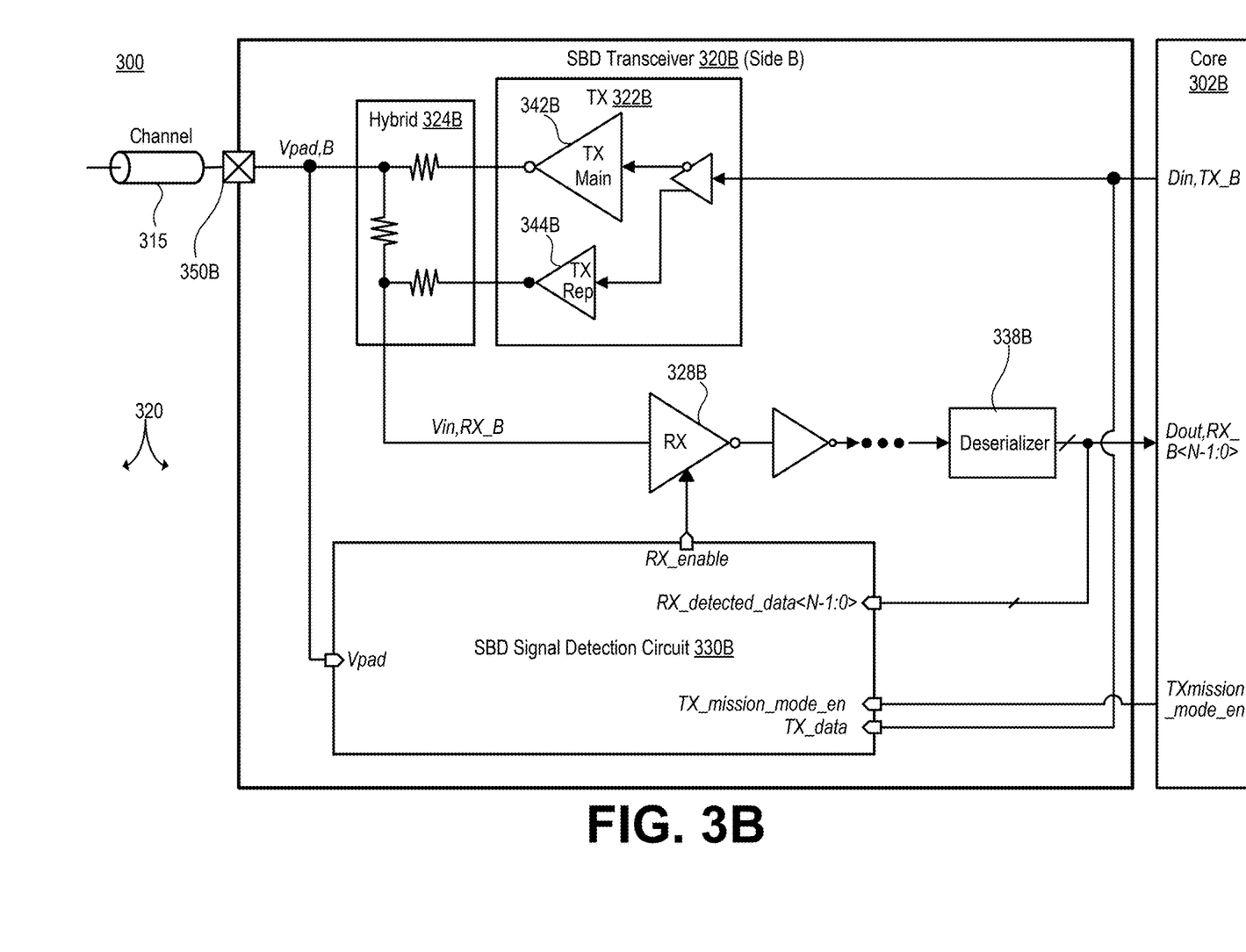

In some embodiments, the second transceiver 120B includes a second signal detection circuit 130B coupled between an I/O pad from the channel 125 and the second receiver 128B (better illustrated in FIG. 3B). In some embodiments, the first signal detection circuit 130A activates or deactivates the second receiver 128B depending on a mode signal received from the second transmitter 122B and the transition of data bits received by the I/O pad over the channel 125 from the first transmitter 122A.

Figure 2:
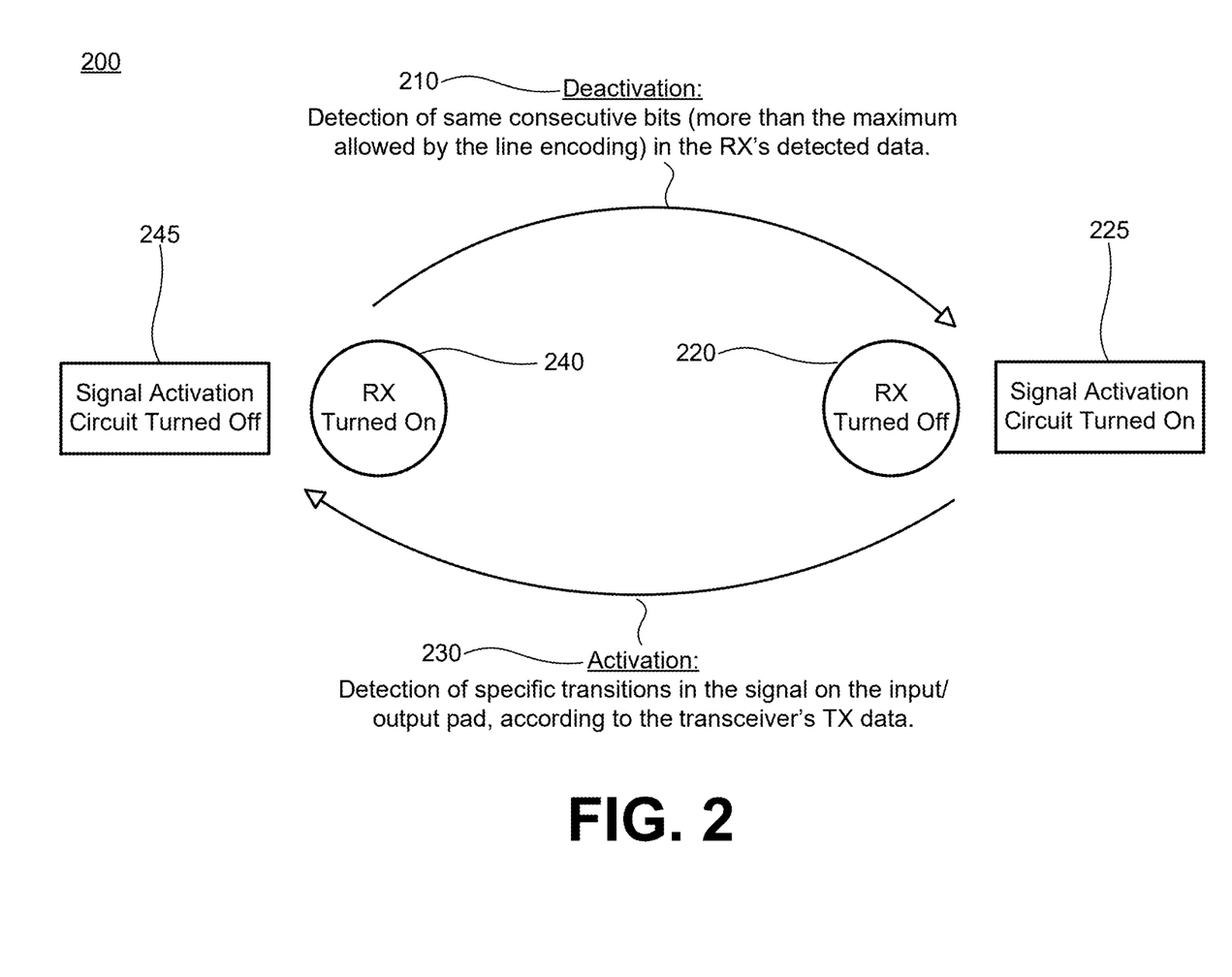
FIG. 2 is a receiver state diagram illustrating deactivation and activation of the receiver in a respective transceiver of the communications system of FIG. 1 according to some embodiments.

FIG. 2 is a receiver state diagram 200 illustrating deactivation and activation of the receiver in a respective transceiver of the communications system 100 of FIG. 1 according to some embodiments. The receiver state diagram 200 illustrates general flow of a transceiver (e.g., the second transceiver 120B for purposes of explanation) deactivating and activating the first receiver 128B depending on a transmission state of the first transmitter 122A of the first transceiver 120A with which the second transceiver 120B is paired.

In at least some embodiments, the transceivers 120A and 120B may employ a line code when encoding bits to be transmitted across the channel 125. A line code is a pattern of voltage, current, or photons used to represent digital data transmitted down a communication channel or to a storage medium. Common line encodings include unipolar, polar, bipolar, and Manchester code. An 8b/10b encoding is a line code that maps 8-bit words to 10-bit symbols to achieve DC balance and bounded disparity, and at the same time provide enough state changes to allow reasonable clock recovery. A 64b/66b is a line code that transforms 64-bit data to 66-bit line code to provide enough state changes to allow reasonable clock recovery and alignment of the data stream at the receiver. In some embodiments, the transceivers 120A and 120 also or alternatively employ a scrambler, which is a device that transposes or inverts signals or otherwise encodes a message at a transmitter to make the message unintelligible at a receiver not equipped with an appropriately set descrambling device.

In some embodiments, any or a combination of these line encodings may require a minimum number of detected bit transitions to be considered "live data." This minimum transitions density may be integrated with how the communications system 100 communicates to ensure that during transmission of live data, a minimum number of bit transitions can be expected. In this way, the transceivers can avoid falsely detecting the transmitter on the opposite side of the channel 125 has exited an idle mode in which the opposing transmitter is transmitting the same value (e.g., all zeros or all ones). This is because, due to errors, this same value may be detected as the opposite value at times. By configuring the transceivers 120A and 120B to require a minimum number of bit transitions, false detection of transmission mode can be avoided. Similarly, avoiding sequences of bits of the same value in the line coding while transmitting live data prevents falsely detecting entering idle mode from transmission mode. Thus, the line encoding may also configure into encoding logic a maximum number of consecutive bits with the same value when in transmission mode.

With renewed reference to FIG. 2, in some embodiments, at operation 210, the first receiver 128A detects the same consecutive bits, e.g., more consecutive bits than the maximum allowed by the line encoding, in the data received by the first receiver 128A from the second transmitter 122B. In response to this detection, at operation 220, the first signal detection circuit 130A deactivates the first receiver 128A and, at operation 225, turns on (or activates) an activation circuit of the first signal detection circuit 130A due to the second transmitter 122B entering idle mode.

At operation 230, this activation circuit detects specific transitions over the input/output pad of the transceiver 120A, e.g., received over the channel 125 channel from the second transmitter 122B that include a minimum number of bit transitions. In response to this detection of exiting idle mode, at operation 240, the activation circuit activates the first receiver 128A and, at operation 245, disables or deactivates the activation circuit of the first signal detection circuit 130A.

FIGS. 3A-3B are a schematic block diagram of an example SBD communications system 300 focused on a particular SBD transceiver pair 320 implementing signal detection for power savings according to at least some embodiments. In some embodiments, the SBD communications system 300 is the SBD communications system 100 and the SBD transceiver pair 320 is one of the SBD transceiver pairs 120 illustrated in FIG. 1. In at least some embodiments, the SBD transceiver pair 320 includes a first transceiver 320A and a second transceiver 350B coupled together across a channel 315, which is also referred to as a data lane or a part of an external bus between two chips, such as Chip A and Chip B (FIG. 1). In embodiments, the SBD communications system 300 further includes a first processing core 302A coupled to the first transceiver 302A and a second processing core 302B coupled to the second transceiver 302B.

In at least some embodiments, the first transceiver 320A includes a first transmitter 322A having a main driver 342A and replica driver 344A, first hybrid circuitry 324A, a first receiver 328A, a first deserializer 338A coupled to an output of the first receiver 328A (optionally via one or more inverter buffers), a first signal detection circuit 330A, and a first input/output (I/O) pad 350A coupled to the channel 315. In embodiments, the first signal detection circuit 330A is coupled between the first I/O pad 350A, the first receiver 328A, an output of the first deserializer 338A, and the first processing core 302A.

Similarly, the second transceiver 320B includes a second transmitter 322B having a main driver 342B and replica driver 344B, second hybrid circuitry 324B, a second receiver 328B, a second deserializer 338B coupled to an output of the second receiver 328B (optionally via one or more inverter buffers), a second signal detection circuit 330B, and a second I/O pad 350B coupled to the channel 315. In embodiments, the second signal detection circuit 330B is coupled between the second I/O pad 350B, the second receiver 328B, an output of the second deserializer 338B, and the second processing core 302B.

In various embodiments, in order to send data from both directions of the channel 315 and allow the correct data to arrive at the input of each receiver 328A or 328B, the first and second transceivers 320A and 320B, respectively, cancel the interference of their respective transmitted data signal from the received data signal that was sent by the opposing transmitters 322B and 322A, respectively. For example, for purposes of explanation, the second transmitter 322B (on Side B) transmits a second data signal over the channel 315, which arrives at the first I/O pad 350A (on SideA). A first data signal sent by the first transmitter 322A (on Side A)

over the channel 315 to Side B, however, interferes with that second data signal in terms of being delivered to the first receiver 328A.

In some embodiments, in order to significantly reduce or eliminate this interference and allow each receiver to receive reliable data signals, the present inverter-based short-reach (ISR)-SBD architecture incorporations a cancelation scheme. For example, in some embodiments, each transmitter 322A and 322B includes a main driver and a replica driver, which was mentioned. In embodiments, for purposes of explanation in the first transceiver 320A, the main driver 342A transmits the first data signal onto the channel 315 while the replica driver 344A outputs an inverted version of the first data signal across the first hybrid circuitry 324. In this way, the hybrid circuitry 324A removes the first data signal from the received data signal (which is a combination of the first and second data signals), leaving only the second data signal transmitted by the second transmitter 322B at the input of the first receiver 328A. The second transceiver 320B may perform a similar cancelation using the replica driver 344B and the second hybrid circuitry 324B.

Further, in some embodiments, and by way of example from a perspective of the first transceiver 320A, assume the second transmitter 322B is active (e.g., in transmission mode) and thus transmitting live data. Thus, the first receiver 328A is also actively receiving this live data (e.g., within the second data signal). In embodiments, as performed at operation 210 (FIG. 2), the second transmitter 322B enters idle mode (e.g., based on signaling from the second processing core 302B) and begins transmitting consecutive bits of the same value (whether all zeros or all ones).

In various embodiments, the first signal detection circuit 330A detects receipt of the consecutive bits of the same value that satisfies a threshold number of consecutive bits, e.g., in the received data directly from the first I/O pad 350B (Vpad,A). This threshold number of consecutive bits may be defined by a particular line encoding (e.g., that exceeds a maximum number of allowed consecutive bits within live data transmission) performed across the channel 315 by the transmitters of the SBD communications system 300. In embodiments, in response to detecting the consecutive bits of the same value, the first signal detection circuit 330A deactivates the first receiver 328A to save power. In at least some embodiments, the first signal detection circuit 330A also activates an activation circuit of the first signal detection circuit 330A in response to deactivating the first receiver 328A or detecting the second transmitter 322B is in the idle mode, as will be explained in more detail with reference to FIG. 5. While some embodiments may be explained with reference to the first signal detection circuit 330A, the second signal detection circuit 330B can be understood to similarly operate with respect to data the first transmitter 322A transmits across the channel 315.

In some embodiments, with the first receiver 328A deactivated and use of the activation circuit (or circuitry) of the first signal detection circuit 330A, power is saved due to the low power required for the activation circuit to monitor for transitions in bits of the incoming data signal that can detect the second transmitter 322B exiting idle mode. For example, in some embodiments and similar to operation 230 of FIG. 2, the activation circuit (FIG. 5) of the first signal detection circuit 330A detects bit transitions in the second data signal received at the first I/O pad 350A from the second transmitter 322B. In embodiments, the first signal detection circuit 330A activates the first receiver 328A in response to detecting the second transmitter 322B enter the transmission mode.

In at least some embodiments, the activation circuit also relies on transmission mode status for deciding whether to activate the first receiver 328A. In embodiments, the activation circuit (of the first signal detection circuit 330A) receives a mode signal (TXmission_mode_en) from the first processing core 302A coupled to the first transceiver 320A. In embodiments, the mode signal indicates whether the first transmitter 322A is in an idle mode or the transmission mode. In some embodiments, the activation circuit activates the first receiver 328A based on the mode signal and the voltage transitions detected, as received from the second transmitter 322B.

Figure 4A:
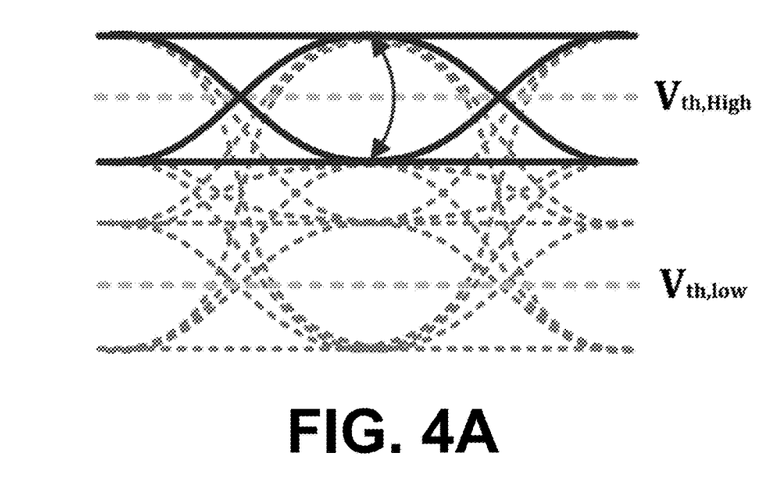
FIG. 4A is a voltage transitional diagram illustrating a first threshold voltage for detecting activation, out of idle mode, of a transmitter on an opposite side transceiver while the near side transmitter transmits a constant one value ('1') in idle mode according to some embodiments.

FIG. 4A is a voltage transitional diagram illustrating a first threshold voltage for detecting activation, out of idle mode, of a transmitter on an opposite side transceiver while the near side transmitter transmits a constant one value ('1') in idle mode according to some embodiments. For example, for purposes of explanation and continuing from the perspective of the first transceiver 320A, assume the first transmitter 322A is transmitting consecutive one values ('1 s') of at least the threshold number of bits dictated by the line encoding, which therefore are included in the data signal received from the first I/O pad 350A. In this case, the data bit transitions move between a medium and a highest threshold voltage, as illustrated.

In some embodiments, the first signal detection circuit 330A receives both the mode signal, as just discussed, as well as this transmission data (TX_data), and is thus able to detect the consecutive ones while knowing the first transmitter 322A is in idle mode. In such embodiments, while the first transmitter 322A transmits all one values, the activation circuit of the first signal detection circuit 330A detects the second transmitter 322B exit idle mode when detecting data bits in the received data signal cross a high threshold voltage value (Vth,High) that is higher than a low threshold voltage value (Vth,low) referenced in FIG. 4B. The crossing of the high threshold voltage value may occur in either direction, moving to a higher voltage or to a lower voltage compared to the Vth, High level.

Figure 4B:
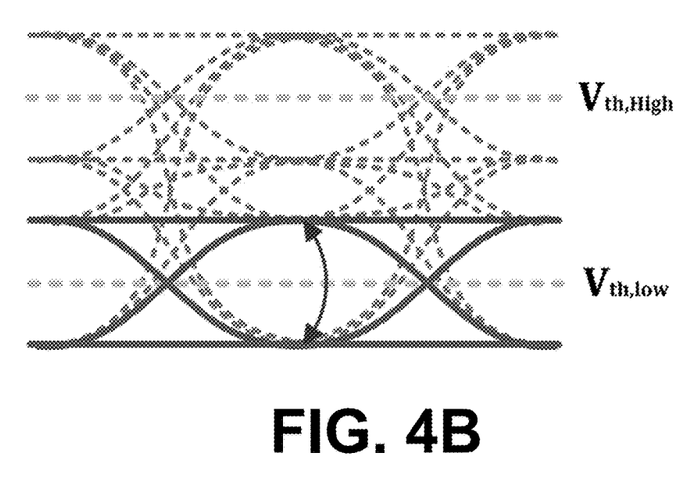
FIG. 4B is a voltage transitional diagram illustrating a second threshold voltage for detecting activation, out of idle mode, of the transmitter on the opposite side transceiver while the near side transmitter transmits a constant zero value ('0') in idle mode according to some embodiments.

FIG. 4B is a voltage transitional diagram illustrating a second threshold voltage for detecting activation, out of idle mode, of the transmitter on the opposite side transceiver while the near side transmitter transmits a constant zero value ('0') in idle mode according to some embodiments. For example, for purposes of explanation and continuing from the perspective of the first transceiver 320A, assume the first transmitter 322A is transmitting consecutive zero values ('0 s') of at least the threshold number of bits dictated by the line encoding, which therefore are included in the data signal received from the first I/O pad 350A. In this case, the data bit transitions move between a medium and a lowest threshold voltage, as illustrated.

In some embodiments, the first signal detection circuit 330A receives both the mode signal, as just discussed, as well as this transmission data (TX_data), and is thus able to detect the consecutive zeroes while knowing the first transmitter 322A is in idle mode. In such embodiments, while the first transmitter 322A transmits all one zeroes, the activation circuit of the first signal detection circuit 330A detects the second transmitter 322B exit idle mode when detecting data bits in the received data signal cross a low threshold voltage value (Vth,low) that is lower than the high threshold voltage value (Vth,High) referenced in FIG. 4A. The crossing of the low threshold voltage value may occur in either direction, moving to a lower voltage or to a higher voltage compared to the Vth,low level.

Figure 4C:
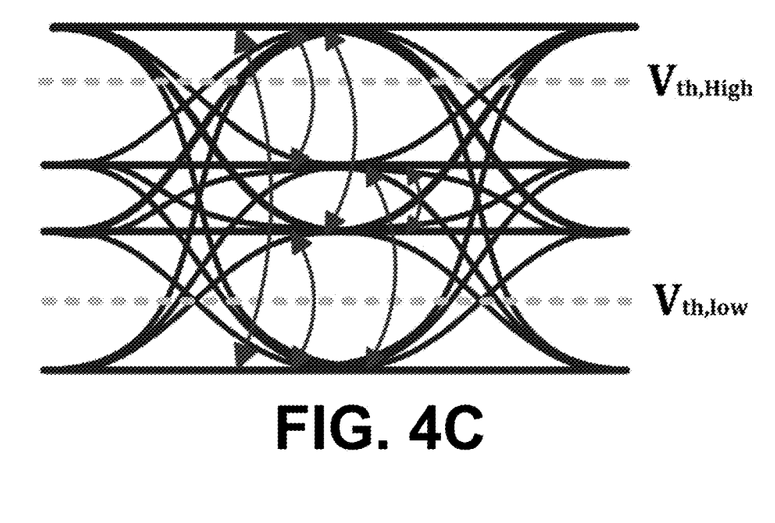
FIG. 4C is a voltage transitional diagram illustrating detecting both the first threshold voltage and the second threshold voltage when the near side transmitter is in transmission mode according to some embodiments.

FIG. 4C is a voltage transitional diagram illustrating detecting both the first threshold voltage and the second threshold voltage when the near side transmitter is in transmission mode according to some embodiments. For example, for purposes of explanation and continuing from the perspective of the first transceiver 320A, assume the first transmitter 322A is in transmission mode and is therefore transmitting live data across the channel 315 to the second transceiver 320B. In this case, all kinds of transitions in the received data signal (at the first I/O pad 350A) may have to occur across all four of the voltage levels illustrated in FIG. 4C. before detecting the second transmitter 322B enter the transmission mode.

In such embodiments, the activation circuit of the first signal detection circuit 330A detects the second transmitter 322B exit idle mode when detecting data bits in the received data signal cross both the first threshold voltage value, referred to herein as the high threshold voltage value (Vth, High), and the second threshold voltage value, referred to herein as the low threshold voltage value (Vth,Low). By detecting the crossing of both threshold voltage levels (or detected Vth values), the activation circuit avoids false detection of the second transmitter 322B exiting idle mode to transmission mode. More specifically, because detecting the data bits from the second transmitter 322B includes detecting of the live data bit transitions from the first transmitter 322A on the same side as the first signal detection circuit 330A, detecting the cross of both the high and low threshold voltage values (or levels) avoid false detection of bit transitions attributable to the second transmitter 322B.

Figure 5:
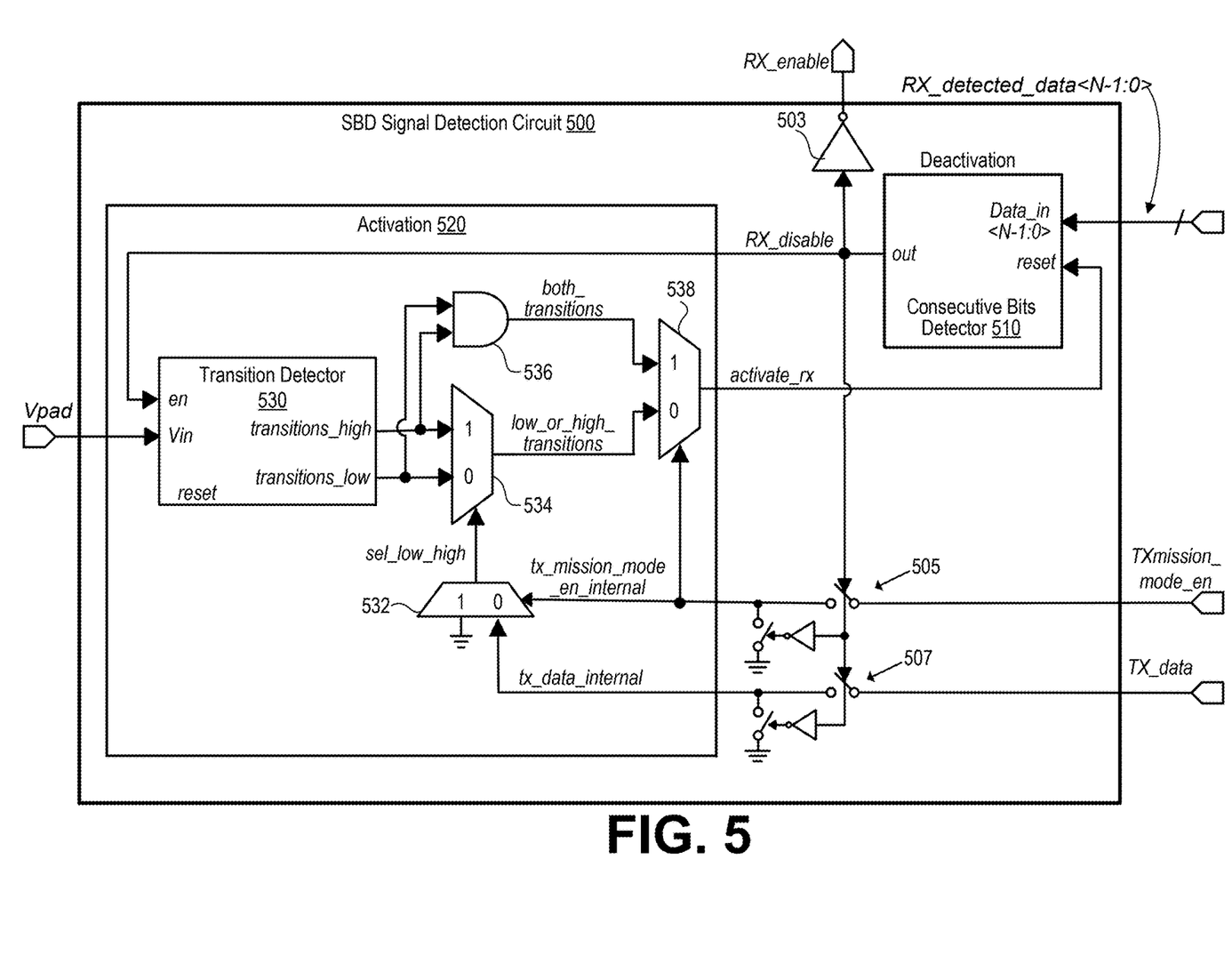
FIG. 5 is a schematic block diagram of a signal detection circuit that may be located in each transceiver of the disclosed SBD communications system according to at least some embodiments.

FIG. 5 is a schematic block diagram of a signal detection circuit 500 that may be located in each transceiver of the disclosed SBD communications system 100 or 300 according to at least some embodiments. In at least some embodiments, for example, the signal detection circuit 500 is an example of either or both of the first and second signal detection circuits 330A and 330B discussed with reference to FIGS. 3A-3B. For simplicity of explanation, as before, description of FIG. 5 will assume that the signal detection circuit 500 is the first signal detection circuit 330A of the first transceiver 320A (FIG. 3A).

In at least some embodiments, the signal detection circuit 500 includes deactivation circuitry such as a consecutive bits detector 510 coupled between the output of the first deserializer 338A and an inverter 502, which inverts an output signal of the consecutive bits detector. An output of the inverter 503 is the receiver activation (or enable) signal that activates or deactivates the first receiver 328A. In some embodiments, the first deserializer 338A deserializes data received from the first receiver 328A, outputting deserialized data (RX_detected_data<N−1:0>). In embodiments, the consecutive bits detector 510 detects, within the deserialized data, that the second transmitter 322B is transmitting consecutive bits of a same value, e.g., all ones or all zeros. In embodiments, a number of the consecutive bits satisfies a threshold number of consecutive bits associated with a line encoding maximum number expected in live data. In some embodiments, the consecutive bits detector 510 asserts an output that deactivates the first receiver 328A, e.g., via the inverter 503, in response to detecting the threshold number of consecutive bits of the same value.

In various embodiments, the signal detection circuit 500 further includes an activation circuit 520 coupled between the first I/O pad 350A, the first processing core 302A, and the consecutive bits detector 510. In embodiments, the activation circuit 520 includes a transition detector 530 to detect whether the voltage transitions from the second transmitter 322B crosses at least one of a first threshold voltage value (Vth, High) or a second threshold voltage value (Vth,Low) that is lower than the first threshold voltage value, as was discussed with reference to FIGS. 3A-4B. In some embodiments, the activation circuit 520, when activated (or enabled) by the asserted output of the consecutive bits detector 510, receives a mode signal (TXmission_mode_en) from the first processing core 302A coupled to the first transceiver 320A. In embodiments, the mode signal indicates whether the first transmitter 322A is in an idle mode or the transmission mode. In embodiments, the activation circuit 520 further activates the first receiver 328A based on the mode signal and voltage transitions from the second transmitter 322B detected by the transition detector 530. In some embodiments, to activate the first receiver 328A, the activation circuit 520 asserts an output (activate_rx) that triggers a reset of the consecutive bits detector 510. In embodiments, this reset causes the consecutive bits detector 510 to deassert an output that causes activation of the first receiver 328A, e.g., via the inverter 503.

More specifically, in at least some embodiments, the signature detection circuit 500 further includes a first switch 505 coupled to the mode signal input received from the first processing core 302A and a second switch 507 coupled to the transmission data signal (TX_data) also received from the first processing core 302A. In embodiments, the first switch 505 and the second switch 507 are each actuated by the output of the consecutive bits detector 510. Thus, an asserted output of the consecutive bits detector 510 activates the transition detector 530 and closes the first and second switches 505 and 507, thus fully activating the activation circuit 520 to monitor for data bit transitions in the data bits received from the second transmitter 322B, e.g., the second data signal discussed previously.

In some embodiments, the activation circuit 520 further includes a first multiplexer 532 in which the zero-valued input is coupled to the second switch 507 (e.g., the incoming transmission data signal), the one-valued input is coupled to ground, and an output is selected using the mode signal (TXmission_mode_en) as the control signal. In this way, the output of the first multiplexer 532, when the first transmitter 322A is in idle mode, is either a one value (when the consecutive bits are ones) or a zero value (when the consecutive bits are zeros).

Figure 6:
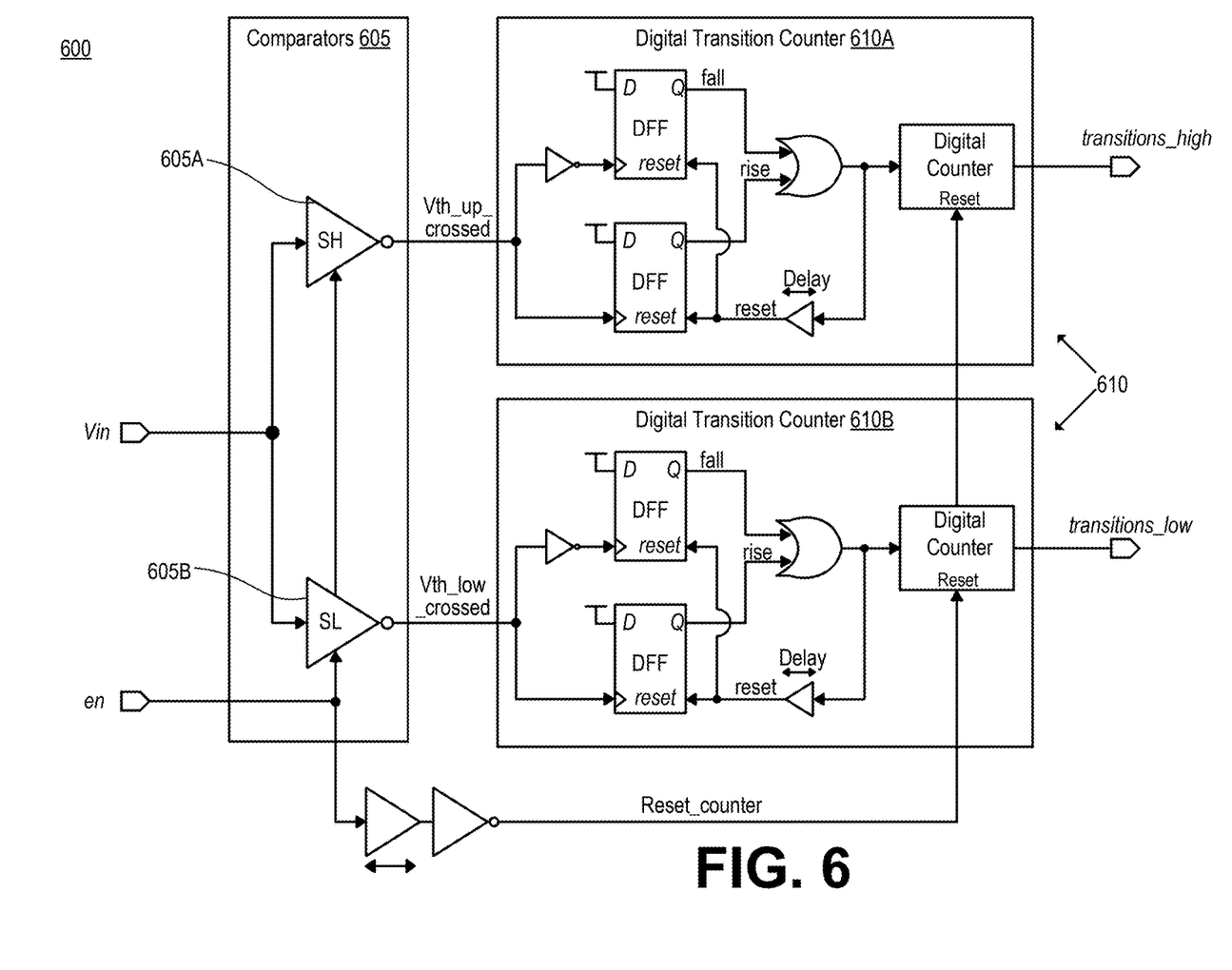
FIG. 6 is a schematic block diagram of a transition detector implemented with skewed inventers according to some embodiments.
Figure 7:
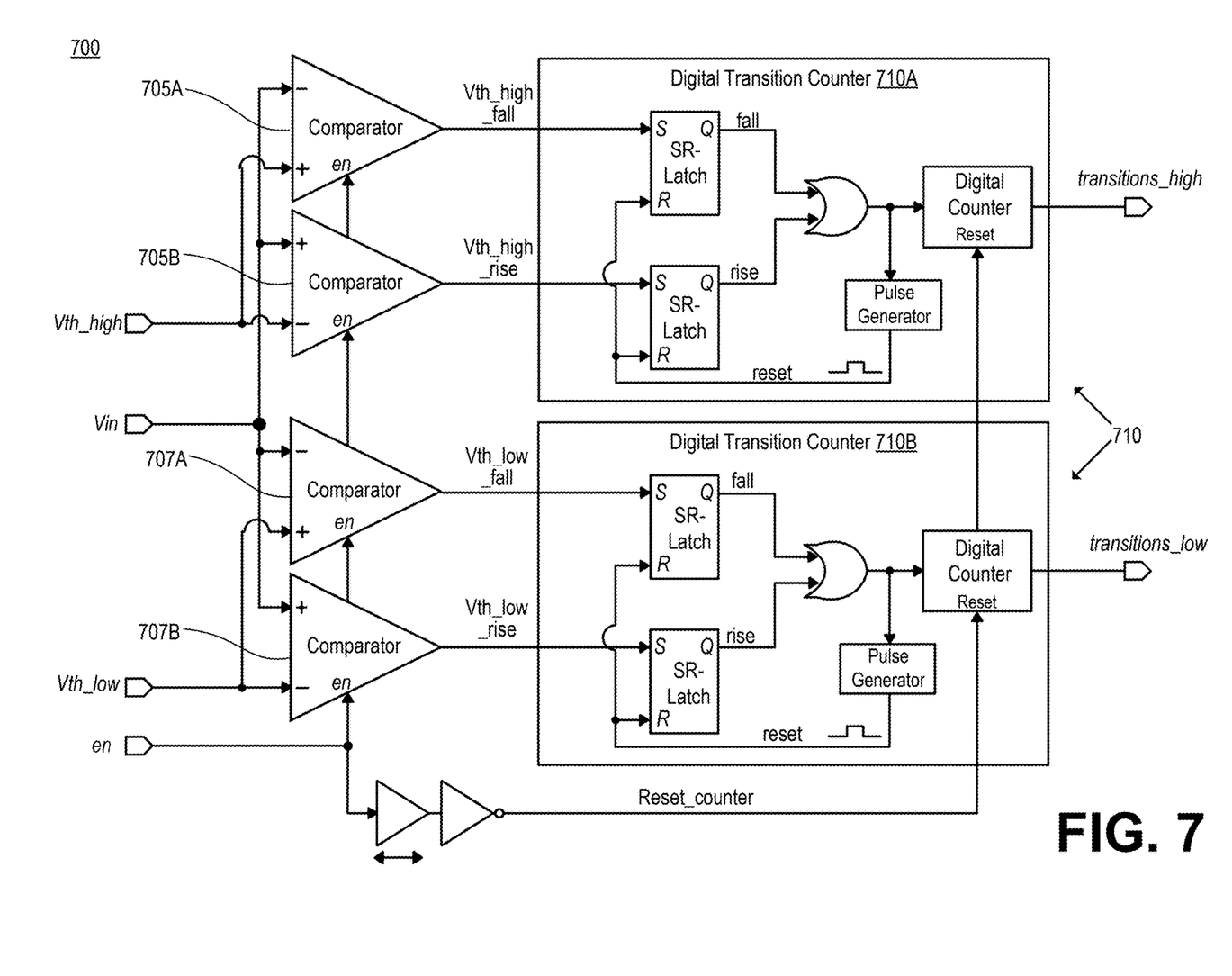
FIG. 7 is a schematic block diagram of a transition detector implemented with pairs of comparators according to other embodiments.

In some embodiments, the activation circuit 520 further includes a second multiplexer 534 that receives, from the transition detector 530, a high transitions signal (transitions_high), e.g., indicating a predetermined threshold number of crossings of the Vth, High value at the one-valued input, and a low transitions signal (transitions_low), e.g., indicating a predetermined threshold number of crossings of the Vth, Low value at the zero-valued input (see FIGS. 6-7 for detailed functionality of the transition detector 530). In embodiments, the second multiplexer 534 receives, as a control signal, the output of the first multiplexer 532, and outputs either the high transitions signal or the low transitions signal depending on the values of the consecutive bits of the same value in the transmission data (TX_data). Thus, in at least some embodiments, the activation circuit 520 activates the first receiver 328A in response to detecting the first transmitter 322A is in idle mode and either of crossing the first threshold voltage value (Vth,High) or the second threshold voltage value (Vth,Low).

In some embodiments, the activation circuit 520 further includes an AND gate 536 and a third multiplexer 538. In embodiments, the AND gate 536 receives, as inputs from the transition detector 530, both of the high transitions signal and the low transitions signal. Further, in embodiments, the third multiplexer 538 receives, as a one-valued input, an output of the AND gate 536 and, as a zero-valued input, an output of the second multiplexer 534, e.g., either the high transitions signal or the low transitions signal. The third multiplexer 538 may also receive, as a control signal, the mode signal (TXmission_mode_en). In this way, in some embodiments, the activate output signal (activate_rx) is the low or high transitions signal in idle mode (when the mode signal is deasserted) and an indication of whether both low and high transitions were detected in transmission mode (when the mode signal is asserted). Thus, in some embodiments, activation circuit 520 activates the first receiver 528A in response to detecting the first transmitter 322A is in transmission mode and both of crossing the first threshold voltage value (Vth,High) and the second threshold voltage value (Vth,Low).

FIG. 6 is a schematic block diagram of a transition detector 600 implemented with skewed inventers according to some embodiments. In at least some embodiments, the transition detector 600 is the transition detector 530 of FIG. 5 intended to detect bit transmissions in the received data signal from an opposing SBD transmitter. In embodiments, the transition detector 600 is a two-stage detector including a pair of comparators 605 coupled to a pair of digital transition counters 610. More specifically, the pair of comparators may include a first skewed inverter 605A to detect crossing the first threshold voltage value (Vth, High) and a second skewed inverter 605B to detect crossing the second threshold voltage value (Vth,Low). In embodiments, the first and second skewed inverters 605A and 605B function as comparators and toggle an output in response to detecting a cross of the respective first or second threshold voltage value.

In at least some embodiments, the pair of digital transition counters 610 include a first digital transition counter 610A coupled to the output of the first skewed inverter 605A and a second digital transition counter 610B coupled to the output of the second skewed inverter 605B. Each of the first and second digital transition counters 610A and 610B may include a pair of D-type flip flops (DFFs) that feed an XOR gate, which in turn triggers a digital counter. A first DFF may detect rising transitions while a second DFF may detect falling transitions.

In some embodiments, each time the output of a respective skewed inverter changes, a transitions signal passes through a corresponding digital transition counter 610A or 610B to add another bit transition to a corresponding digital counter. In embodiments, in response to the digital counter of the first transitions counter 610A reaching a predefined threshold number of transitions across the first threshold voltage (or Vth, High) value, the first transitions counter 610A may output a transitions high signal (transitions_high). In embodiments, in response to the digital counter of the second transitions counter 610B reaching a predefined threshold number of transitions across the second threshold voltage (or Vth, Low) value, the second transitions counter 610B may output a transitions low signal (transitions_low). In some embodiments, the transition detector 600 includes a reset input (en) that resets the digital counters to zero as well as disables the first and second skewed inverters 605A and 605B, enabling power saving during deactivation of the activation circuit 520.

FIG. 7 is a schematic block diagram of a transition detector 700 implemented with pairs of comparators according to other embodiments. In at least some embodiments, the transition detector 700 is the transition detector 530 of FIG. 5 intended to detect bit transmissions in the received data signal form an opposing SBD transmitter. In embodiments, the transition detector 700 is a two-stage detector including pairs of comparators coupled to a pair of digital transition counters 710. More specifically, a first pair of comparators may include a first comparator 705A to detect a falling cross of the first threshold voltage value (Vth, High) and a second comparator 705B to detect a rising cross of the first threshold voltage value (Vth,High). Further, a second pair of comparators may include a third comparator 707A to detect a falling cross of the second threshold voltage value (Vth, Low) and a fourth comparator 707B to detect a rising cross of the second threshold voltage value (Vth,Low).

In some embodiments, the first pair of comparators are coupled to a pair of DFFs of a first digital transition counter 710A, which pair of DFFs feed an XOR gate, which in turns feeds a digital counter of the first digital transition counter 710A. In embodiments, the second pair of comparators are coupled to a pair of DFFs of a second digital transition counter 710B, which pair of DFFs feed an XOR gate, which in turn feeds a digital counter of the second digital transition counter 710B. Thus, the transition detector 700 functions similarly to the transition detector 600, except employing a first pair of comparator in lieu of the first skewed inverter 605A and a second pair of comparators in lieu of the second skewed inverter 605B. The input reset (en) may similarly reset the digital counters of the first and second digital transition counters 710A and 710B and disable the pairs of comparators for a similar power savings during deactivation of the activation circuit 520.

Considering the embodiments of both FIG. 6 and FIG. 7, a transition detector such as the transition detector 530 may include one or more first comparators to detect transitions across the first threshold voltage value (Vth,High) and a first digital transition counter coupled to the one or more first comparators. In embodiments, the first digital transition counter asserts a transitions high output (transitions_high) in response to detecting a predetermined number of transitions across the first threshold voltage value. In some embodiments, the one or more first comparators comprise a first skewed inverter.

In such embodiments, the transition detector may further include one or more second comparators to detect transitions across the second threshold voltage value (Vth,Low) and a second digital transition counter coupled to the one or more second comparators. In embodiments, the second digital transition counter asserts a transitions low output (transitions_low) in response to detecting a predetermined number of transitions across the second threshold voltage value. In some embodiments, the one or more second comparators comprise a second skewed inverter.

Figure 8:
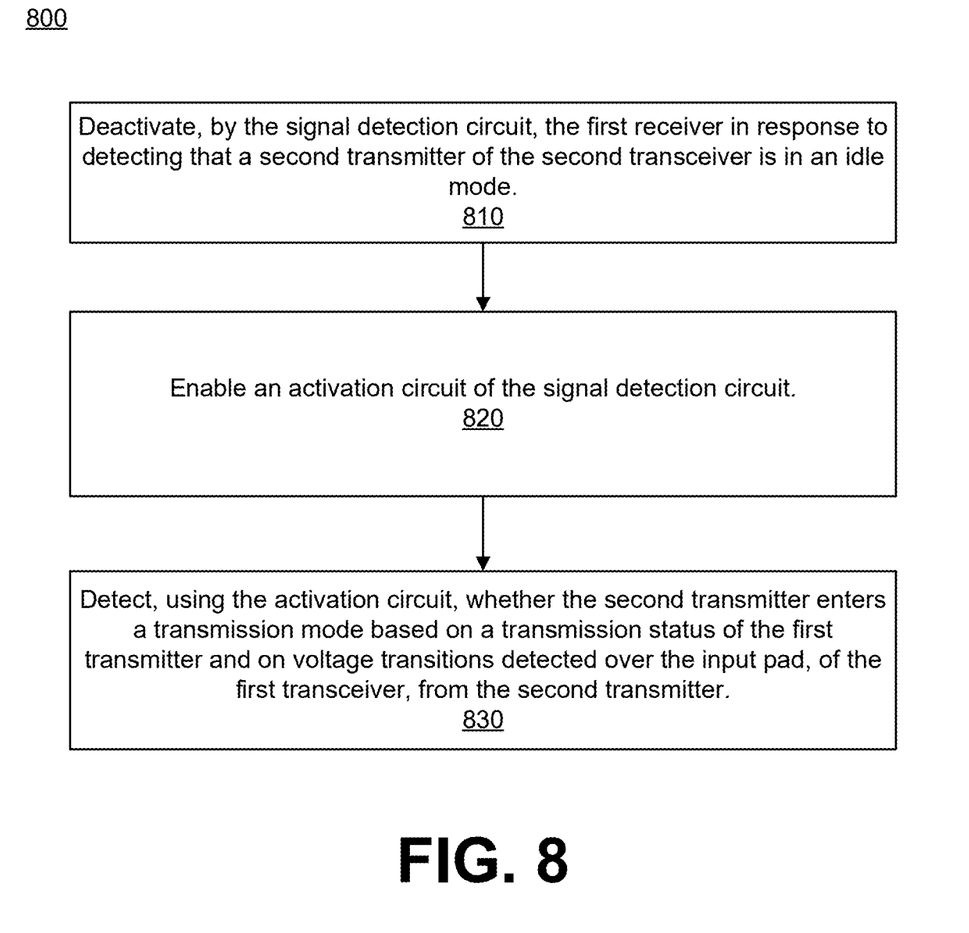
FIG. 8 is a flow chart of an example method for operating a paired transceiver in an SBD-based communications system to signal detect for power savings according to some embodiments.

FIG. 8 is a flow chart of an example method 800 for operating a paired transceiver in an SBD-based communications system to signal detect for power savings according to some embodiments. The method 800 can be performed by processing logic comprising hardware, software, firmware, or any combination thereof. For example, the method 800 can be performed by a first signal detection circuit along with information provided by a processing core to the signal detection (see FIGS. 1-7). For example, the processing logic could be the first signal detection circuit 330A along with information received from the first processing core 302A or the second signal detection circuit 330B along with information received from the second processing core 302B, either of which may be the signal detection circuit 500 (FIG. 5).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic (e.g., first signal detection circuit) deactivates the first receiver in response to detecting that a second transmitter of the second transceiver is in an idle mode.

At operation 820, the processing logic activates an activation circuit of the signal detection circuit. For example, in some embodiments, activating the activation circuit is in response to deactivating the first receiver or detecting the second transmitter is in the idle mode. In some embodiments, the activation circuit is the activation circuit 520 of the signal detection circuit 500.

At operation 830, the processing logic employs the activation circuit to detect whether the second transmitter enters a transmission mode based on a transmission status (e.g., from the mode signal) of the first transmitter and on voltage transitions detected over the I/O pad, of the first transceiver, from the second transmitter.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. An integrated circuit comprising:
   a first transceiver of a plurality of simultaneous bidirectional (SBD) transceivers, wherein the first transceiver is coupled to a second transceiver across a channel; and
   a signal detection circuit coupled to a first receiver, a first transmitter, and to an input/output (I/O) pad of the first transceiver, wherein the signal detection circuit is to:
      deactivate the first receiver in response to detecting that a second transmitter of the second transceiver is in an idle mode;
      activate an activation circuit of the signal detection circuit; and
      detect, using the activation circuit, whether the second transmitter enters a transmission mode based on a transmission status of the first transmitter and on voltage transitions detected over the I/O pad from the second transmitter.

2. The integrated circuit of claim 1, wherein activating the activation circuit is in response to deactivating the first receiver or detecting the second transmitter is in the idle mode, wherein the signal detection circuit is further to:
   activate the first receiver in response to detecting the second transmitter enter the transmission mode; and
   deactivate the activation circuit.

3. The integrated circuit of claim 1, further comprising:
   a deserializer coupled to an output of the first receiver, the deserializer to deserialize data received from the first receiver; and
   wherein the signal detection circuit is coupled to the deserializer and comprises a consecutive bits detector to:
      detect, within the deserialized data, that the second transmitter is transmitting consecutive bits of a same value, wherein a number of the consecutive bits satisfies a threshold number of consecutive bits; and
      assert an output that deactivates the first receiver.

4. The integrated circuit of claim 1, wherein the activation circuit comprises a transition detector to detect whether the voltage transitions from the second transmitter crosses at least one of a first threshold voltage value or a second threshold voltage value that is lower than the first threshold voltage value, and wherein the activation circuit is further to, when activated:
   receive a mode signal from a processing core coupled to the first transceiver, the mode signal indicating whether the first transmitter is in an idle mode or the transmission mode; and activate the first receiver based on the mode signal and voltage transitions from the second transmitter detected by the transition detector.

5. The integrated circuit of claim 4, wherein the activation circuit is to activate the first receiver in response to detecting the first transmitter is in idle mode and either of crossing the first threshold voltage value or the second threshold voltage value.

6. The integrated circuit of claim 4, wherein the activation circuit is to activate the first receiver in response to detecting the first transmitter is in transmission mode and both of crossing the first threshold voltage value and the second threshold voltage value.

7. The integrated circuit of claim 4, wherein the signal detection circuit further comprises a consecutive bits detector coupled to the first receiver and, to activate the first receiver, the activation circuit is to assert an output that triggers a reset of the consecutive bits detector, wherein the reset to cause the consecutive bits detector to deassert an output that causes activation of the first receiver.

8. The integrated circuit of claim 4, wherein the transition detector comprises:
one or more first comparators to detect transitions across the first threshold voltage value;
a first digital transition counter coupled to the one or more first comparators, the first digital transition counter to assert a transitions high output in response to detecting a predetermined number of transitions across the first threshold voltage value;
one or more second comparators to detect transitions across the second threshold voltage value; and
a second digital transition counter coupled to the one or more second comparators, the second digital transition counter to assert a transitions low output in response to detecting a predetermined number of transitions across the second threshold voltage value.

9. A method of operating a first transceiver paired with a second transceiver of a plurality of simultaneous bidirectional (SBD) transceivers, the first transceiver including a first receiver, a first transmitter, an input/output (I/O) pad coupled to a channel, and a signal detection circuit, wherein the method comprises:
deactivating, by the signal detection circuit, the first receiver in response to detecting that a second transmitter of the second transceiver is in an idle mode;
activating an activation circuit of the signal detection circuit; and
detecting, using the activation circuit, whether the second transmitter enters a transmission mode based on a transmission status of the first transmitter and on voltage transitions detected over the I/O pad, of the first transceiver, from the second transmitter.

10. The method of claim 9, wherein activating the activation circuit is in response to deactivating the first receiver or detecting the second transmitter is in the idle mode, further comprising:
activating the first receiver in response to detecting the second transmitter enter the transmission mode; and
disabling the activation circuit.

11. The method of claim 9, wherein the first transceiver further comprises a deserializer coupled to an output of the first receiver, the method further comprising:
deserializing, by the deserializer, data received from the first receiver;

detecting, by a consecutive bits detector of the signal detection circuit, within the deserialized data, that the second transmitter is transmitting consecutive bits of a same value;
determining that a number of the consecutive bits satisfies a threshold number of consecutive bits; and
asserting, by the signal detection circuit, an output that deactivates the first receiver.

12. The method of claim 9, wherein the activation circuit comprises a transition detector and wherein the method further comprises:
detecting, by the transition detector, the voltage transitions from the second transmitter crosses at least one of a first threshold voltage value or a second threshold voltage value, which is lower than the first threshold voltage value;
receiving, by the activation circuit, a mode signal from a processing core coupled to the first transceiver, the mode signal indicating whether the first transmitter is in an idle mode or the transmission mode; and
activating, by the activation circuit, the first receiver based on the mode signal and voltage transitions from the second transmitter detected by the transition detector.

13. The method of claim 12, wherein the activating the first receiver is in response to detecting the first transmitter is in idle mode and detecting either of crossing the first threshold voltage value or the second threshold voltage value.

14. The method of claim 12, wherein the activating is in response to detecting the first transmitter is in transmission mode and detecting both of crossing the first threshold voltage value and the second threshold voltage value.

15. The method of claim 12, wherein activating the first receiver comprises asserting, by the activation circuit, an output that triggers a reset of a consecutive bits detector, wherein the reset to cause the consecutive bits detector to deassert an output that causes activation of the first receiver.

16. A communications system comprising:
a transceiver pair of a plurality of simultaneous bidirectional (SBD) transceivers, the transceiver pair comprising a first transceiver coupled to a second transceiver over a channel;
a processing core coupled to the first transceiver, the processing core to provide a mode signal to the first transceiver, the mode signal indicating whether a first transmitter of the first transceiver is in an idle mode or a transmission mode; and
a signal detection circuit coupled to the first transceiver and the processing core, wherein the signal detection circuit is to:
deactivate a first receiver, of the first transceiver, in response to detecting that a second transmitter of the second transceiver is in the idle mode;
activate an activation circuit of the signal detection circuit; and
detect, using the activation circuit, whether the second transmitter enters a transmission mode based on the mode signal and on voltage transitions detected over an input/output (I/O) pad, of the first transceiver, from the second transmitter.

17. The communications system of claim 16, wherein activating the activation circuit is in response to deactivating the first receiver or detecting the second transmitter is in the idle mode, wherein the signal detection circuit is further to:

activate the first receiver in response to detecting the second transmitter enter the transmission mode; and deactivate the activation circuit.

18. The communications system of claim 16, wherein the first transceiver further comprises:
 a deserializer coupled to an output of the first receiver, the deserializer to deserialize data received from the first receiver; and
 wherein the signal detection circuit is coupled to the deserializer and comprises a consecutive bits detector to:
  detect, within the deserialized data, that the second transmitter is transmitting consecutive bits of a same value, wherein a number of the consecutive bits satisfies a threshold number of consecutive bits; and
  assert an output that deactivates the first receiver.

19. The communications system of claim 16, wherein the activation circuit comprises a transition detector to detect whether the voltage transitions from the second transmitter crosses at least one of a first threshold voltage value or a second threshold voltage value, which is lower than the first threshold voltage value, and wherein the activation circuit is further to, when activated:
 receive the mode signal from the processing core; and
 activate the first receiver based on the mode signal and voltage transitions from the second transmitter detected by the transition detector.

20. The communications system of claim 19, wherein the activation circuit is to activate the first receiver in response to detecting one of:
 the first transmitter is in idle mode and either of crossing the first threshold voltage value or the second threshold voltage value; or
 the first transmitter is transmission mode and both of crossing the first threshold voltage value and the second threshold voltage value.

21. The communications system of claim 19, wherein the signal detection circuit further comprises a consecutive bits detector coupled to the first receiver and, to activate the first receiver, the activation circuit is to assert an output that triggers a reset of the consecutive bits detector, wherein the reset to cause the consecutive bits detector to deassert an output that causes activation of the first receiver.

* * * * *